United States Patent
Levy et al.

(10) Patent No.: US 10,244,010 B2
(45) Date of Patent: Mar. 26, 2019

(54) DATA PROCESSING APPARATUS CONFIGURED TO RECOVER A NETWORK CONNECTION, A METHOD, A SYSTEM AND A NON-TRANSITORY COMPUTER READABLE MEDIUM CONFIGURED TO PERFORM SAME

(71) Applicants: Roger Levy, Berkeley Heights, NJ (US); Lawrence O'Gorman, Madison, NJ (US); Xiaoyang Wang, Murray Hill, NJ (US)

(72) Inventors: Roger Levy, Berkeley Heights, NJ (US); Lawrence O'Gorman, Madison, NJ (US); Xiaoyang Wang, Murray Hill, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 108 days.

(21) Appl. No.: 15/434,561

(22) Filed: Feb. 16, 2017

(65) Prior Publication Data
US 2018/0234468 A1 Aug. 16, 2018

(51) Int. Cl.
*H04L 29/06* (2006.01)
*G06F 9/48* (2006.01)

(52) U.S. Cl.
CPC .......... *H04L 65/1069* (2013.01); *G06F 9/485* (2013.01); *G06F 9/4843* (2013.01)

(58) Field of Classification Search
USPC ........................................................ 709/227
See application file for complete search history.

(56) References Cited

U.S. PATENT DOCUMENTS

| | | | |
|---|---|---|---|
| 6,108,660 A | 8/2000 | Ikeda et al. | |
| 7,277,938 B2* | 10/2007 | Duimovich | H04L 41/5016 707/999.104 |
| 2002/0029357 A1* | 3/2002 | Charnell | G06F 8/4442 714/5.11 |
| 2003/0023656 A1 | 1/2003 | Hutchison et al. | |
| 2008/0201118 A1* | 8/2008 | Luo | G06F 17/2247 703/2 |
| 2010/0169888 A1* | 7/2010 | Hare | G06Q 10/107 718/102 |
| 2012/0124504 A1* | 5/2012 | Maybee | G06F 8/34 715/772 |

OTHER PUBLICATIONS

International Search Report dated May 8, 2018 for International Application No. PCT/US2018/018176.
Jerry J. Harrow Jr. et al., "Runtime Checking of Multithreaded Applications with Visual Threads", Jan. 1, 2006, Spin Model Checking and Software Verification Lecture Notes in Computer Science; LNCS, Springer, Berlin, DE, pp. 331-342, XP019049251, ISBN: 978-3540-41030-0.

* cited by examiner

*Primary Examiner* — Jude Jean Gilles
(74) *Attorney, Agent, or Firm* — Harness, Dickey & Pierce, P.L.C.

(57) ABSTRACT

In at least some example embodiments, a data processing apparatus is configured to recover a network connection within an application framework that hides sockets by separating acquisition and processing into different threads of the same process, and, thus, when the processing thread is unable to retrieve a frame from the acquisition thread, the data processing device may terminate the acquisition thread with impunity since all important application state may safely remain within the processing thread.

20 Claims, 6 Drawing Sheets

DATA PROCESSING APPARATUS CONFIGURED TO RECOVER A NETWORK CONNECTION, A METHOD, A SYSTEM AND A NON-TRANSITORY COMPUTER READABLE MEDIUM CONFIGURED TO PERFORM SAME

BACKGROUND

1. Field

Example embodiments relate generally to a data processing apparatus configured to recover a network connection, a method, a system and/or a non-transitory computer readable medium configured to perform the same.

2. Related Art

Software development may be accelerated by using widely available application libraries that manage lower-level functions. Various application libraries, such as Open Source Computer Vision (OpenCV), may be utilized for video and video-analytics applications to provide useful functions. These functions may include login and authentication to video sources, decoding of video streams, and video frame manipulations such as color space conversions and rotations.

Typically, these library functions may not expose the underlying software network control entities, such as a network sockets, used to perform the functions. The network socket may be a type of network resource in networking software (e.g., a protocol stack) for sending or receiving data in a computer network. Since the underlying control entities are not exposed, in the event of a network error or interruption, the library function may cause the Application that includes the same to deadlock. For example, the library function may deadlock when reading from the network socket. Conventionally, the application may need to restart to recover from the deadlock, which may result in loss of state information associated with the Application that may adversely affect the end-user service.

SUMMARY

In at least some example embodiments, a data processing apparatus is configured to recover a network connection within an application framework that hides sockets by separating acquisition and processing into different threads of the same process, and, thus, when the processing thread is unable to retrieve a frame from the acquisition thread, the data processing device may terminate the acquisition thread with impunity since application state information may safely remain within the processing thread.

In some example embodiments, the data processing apparatus includes at least one processor configured to execute a process including at least a processing thread, the processing thread configured to, create an acquisition thread within the process, the acquisition thread being subordinate to the processing thread, request a frame associated with a source device from the acquisition thread, and restart the acquisition thread, if the frame is unavailable.

In some example embodiments, the processor is configured to restart the acquisition thread such that state information associated with the process remains intact within the processing thread when the acquisition thread is terminated.

In some example embodiments, the processor is configured to recover a network connection between the acquisition thread and the source device by iteratively restarting the acquisition thread until the frame is available.

In some example embodiments, the processor is configured to extract the frame from a data queue.

In some example embodiments, the data queue is simultaneously accessible by the acquisition thread and the processing thread.

In some example embodiments, the processor is configured to restart the acquisition thread, if the processor determines that the frame is unavailable in the data queue within a set time period after requesting the frame.

In some example embodiments, the processor is configured to determine, within the processing thread, whether the frame is unavailable by analyzing a semaphore accessible by both the acquisition thread and the processing thread, the semaphore indicating whether the frame is available for extraction by the processing thread.

In some example embodiments, the processor is configured to instruct the acquisition thread to, attempt to establish a network connection with the source device, and if the network connection is established, acquire the frame from the source device over the network connection, store the frame in the data queue, and increment the semaphore.

In some example embodiments, the processor is configured to instruct the acquisition thread to establish the network connection by calling an Open Source Computer Vision (OpenCV) function, the OpenCV function abstracting one or more pieces of information associated with the network connection from the acquisition thread.

Some example embodiments relate to a method of recovering a network connection to one or more source devices In some example embodiments, the method includes creating an acquisition thread within the process, the acquisition thread being subordinate to a processing thread; requesting a frame associated with a source device from the acquisition thread; and restarting the acquisition thread, if the frame is unavailable.

In some example embodiments, the restarting restarts the acquisition thread such that state information associated with the process remains intact within the processing thread when the acquisition thread is terminated.

In some example embodiments, the requesting includes extracting the frame from a data queue, and the restarting includes iteratively restarting the acquisition thread until the frame is available to recover a network connection between the acquisition thread and the source device.

In some example embodiments, the method further includes determining whether the frame is unavailable by analyzing a semaphore accessible by both the acquisition thread and the processing thread, the semaphore indicating whether the frame is available for extraction by the processing thread, wherein the restarting restarts the acquisition thread, if the determining determines that the frame is unavailable in a data queue within a set time period after requesting the frame.

In some example embodiments, the method further includes attempting to establish a network connection with the source device, and if the network connection is established, acquiring the frame from the source device over the network connection, storing the frame in the data queue, and incrementing the semaphore.

In some example embodiments, the attempting to establish comprises: attempting to establish, via the acquisition thread, the network connection with the source device by calling an Open Source Computer Vision (OpenCV) function, the OpenCV function abstracting one or more pieces of information associated with the network connection from the acquisition thread.

Some example embodiments relate to a data streaming system.

In some example embodiments, the data streaming system includes a source device configured to stream data; and a data processing apparatus including a processor configured to execute a process including at least a processing thread, the processing thread configured to, create an acquisition thread within the process, the acquisition thread being subordinate to the processing thread, request a frame associated with the source device from the acquisition thread, and restart the acquisition thread, if the frame is unavailable.

In some example embodiments, the data processing apparatus is configured to, within the processing thread, restart the acquisition thread such that state information associated with the process remains intact within the processing thread when the acquisition thread is terminated.

In some example embodiments, the data processing apparatus is configured to, extract the frame from a data queue, and iteratively restart the acquisition thread until the frame is available to recover a network connection between the acquisition thread and the source device.

In some example embodiments, the data processing apparatus is configured to, determine, within the processing thread, whether the frame is unavailable by analyzing a semaphore accessible by both the acquisition thread and the processing thread, the semaphore indicating whether the frame is available for extraction by the processing thread, and restart the acquisition thread, if the data processing apparatus determines, within the processing thread, that the frame is unavailable in a data queue within a set time period after requesting the frame.

In some example embodiments, the data processing apparatus is configured to, attempt to establish, via the acquisition thread, a network connection with the source device by calling an Open Source Computer Vision (OpenCV) function, the OpenCV function abstracting one or more pieces of information associated with the network connection from the acquisition thread, and if the network connection is established, acquire the frame from the source device over the network connection, store the frame in the data queue, and increment the semaphore.

Some example embodiments relate to a non-transitory computer readable medium storing instructions, that, when executed by a processor, configure the processor to perform the method of recovering a network connection to one or more source devices.

BRIEF DESCRIPTION OF THE DRAWINGS

At least some example embodiments will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Various example embodiments will now be described more fully with reference to the accompanying drawings in which some example embodiments are shown.

Detailed illustrative embodiments are disclosed herein. However, specific structural and functional details disclosed herein are merely representative for purposes of describing at least some example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments are discussed herein as being implemented in a suitable computing environment. Although not required, example embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof at, for example, hosts, computers, cloud computing based servers accessible via a network, web servers, etc. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Figure 1:
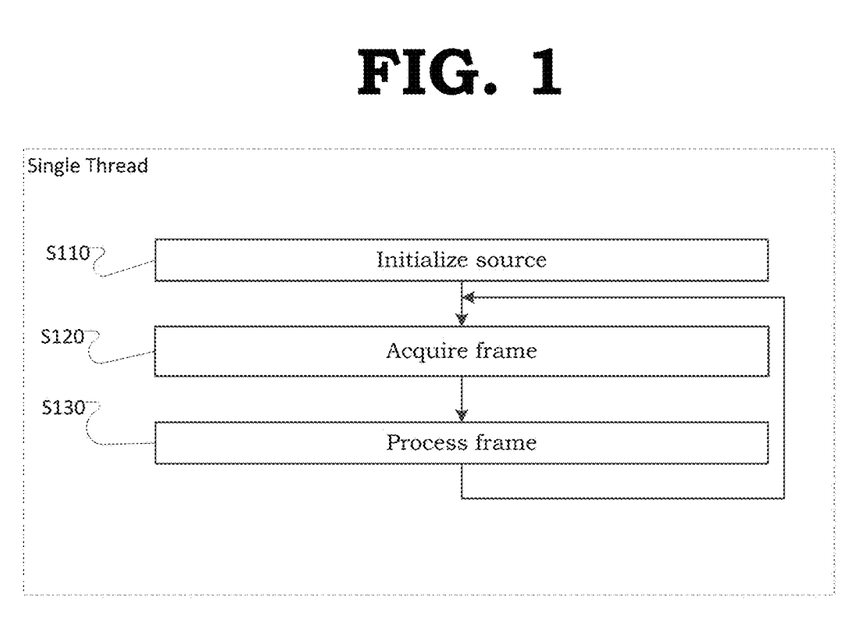
FIG. 1 is a flow chart of a conventional usage model to control application program interface (API) functions to acquire streaming media.

FIG. 1 is a flow chart of a conventional usage model to control application program interface (API) functions to acquire streaming media.

Referring to FIG. 1, in operation S110, a conventional apparatus (not shown) may initialize connections with a source device (not shown). The source device may be various devices that stream media (e.g., audio and/or video data).

For example, in some example embodiments, the conventional apparatus may perform an OpenCV video source initialization using an OpenCV API function such as cvCaptureFromFile. The apparatus may use this function by supplying a single argument that identifies the source device. The source device may be a file containing data encoded by a standard video encoder, or a Uniform Resource Locator (URL) that uniquely identifies the source device.

If the function is able to identify the source device, the function may return a pointer to an opaque data structure, i.e. a data structure that is difficult to examine, and from which information cannot easily be extracted, by the application code. If the function fails to identify the source device, the function may return a null value.

The function may make the information difficult to extract by abstracting the data using for example, encapsulation. For example, APIs written in modem programming languages, especially object-oriented languages like C++, Java, and Python, may have public and private elements. The public elements, such as functions or data structures, may have public characteristics so their behavior and/or contents can be extended by an application writer. On the other hand, private elements, such as OpenCV elements, may not be extended, usually because the API developers believe that could result in insidious bugs or instability.

Therefore, the conventional apparatus may be unable to access control and/or status information (e.g. networking control and status monitoring information) about the media stream that the source device 110 delivers to the apparatus.

In operation S120, the conventional apparatus may attempt to acquire a frame of the media stream from the source device.

For example, in some example embodiments, the conventional apparatus may execute an OpenCV API function such as cvQueryFrame. The application may use this function by, for example, providing, as an argument, the opaque data structure returned by cvCaptureFromFile operation executed in operation S110. However, example embodiments are not limited thereto.

The conventional apparatus may receive a data structure that contains a frame of the data, when the OpenCV API function acquires the next frame. For example, when the media stream is a video stream, the conventional apparatus may receive a data structure that contains an image of the video stream as a bitmap image, when the OpenCV API function acquires the next video frame.

In contrast, if the OpenCV API function fails to acquire the next frame, the OpenCV API function may return a null value to the conventional apparatus. However, if the source device 110 is a networked camera, such as an IP camera, the function may not return but instead may "hang." In the conventional method of FIG. 1, this hang may permanently stall the application code. Therefore, conventionally, a user may need to manually reboot the thread that includes application program interface (API) functions, which may result in loss of application state information. For example, information associated with the frames such as averages, peaks, trends, minimums, correlations, etc., over time.

In operation S130, after the conventional apparatus has acquired a new frame, the conventional apparatus may perform application processing on the frame. This processing may be any unique processing implemented based on the goals of the application designer. In some example embodiments, this processing may be used in surveillance and monitoring systems, and, thus may need to be resilient to failures that interrupt processing. However, as discussed above, conventionally, the application code may stall, which may result in loss of the application state information.

Figure 2:
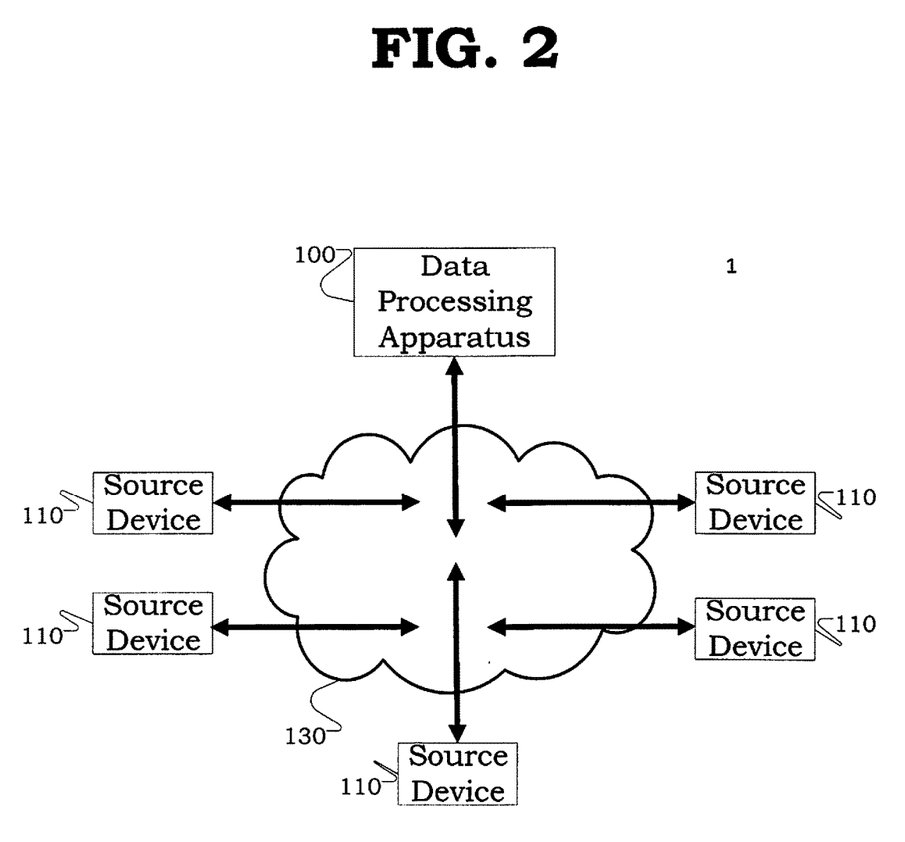
FIG. 2 illustrates a data streaming system according to example embodiments.

FIG. 2 illustrates a data streaming system according to example embodiments.

Referring to FIG. 2, a data streaming system 1 may include a data processing apparatus 100 connected to one or more source devices 110 over a network 130.

As discussed in more detail below in regards to FIGS. 4 to 6, the data processing apparatus 100 may be configured to recover a network connection with the one or more source devices 110, within an application framework that restricts control over the sockets connected to the one or more source devices 110, by separating acquisition of data and processing into different threads of the same process, and, thus, when the processing thread is unable to retrieve frames from the acquisition thread, the data processing apparatus 100 may terminate the acquisition thread with impunity since application state information may safely remain within the processing thread. For example, as the data processing apparatus 100 performs data analytics on the retrieved frames, the data processing apparatus 100 may accumulate information such as averages, peaks, trends, minimums, correlations, etc., over time. In some example embodiments, to improve the performance of the data processing apparatus 100, the information may not be written to a non-volatile memory. Therefore, if this information is maintained by an unresponsive thread, the information may be lost when the thread is terminated.

The one or more source devices 110 may be various devices that stream media (e.g., audio and/or video data), such as internet protocol (IP) cameras, smart phones, digital video records (DVRs), etc. However, example embodiments are not limited thereto. For example, the one or more source devices 110 may be any device capable of streaming media via a connection (e.g., a socket) between the respective one of the one or more source devices 110 and the data processing apparatus 100. In some example embodiments, the one or more source devices 110 and the data processing apparatus 100 may perform machine-to-machine (M2M) communication via the network 130 without human intervention.

The network 130 may be any type of electronically connected group of computers and/or devices, including, for example, Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the network 130 includes network variations such as the public Internet, a private network within the Internet, a secure network within the Internet, a private network, a public network, a value-added network, an intranet, and the like.

Figure 3:
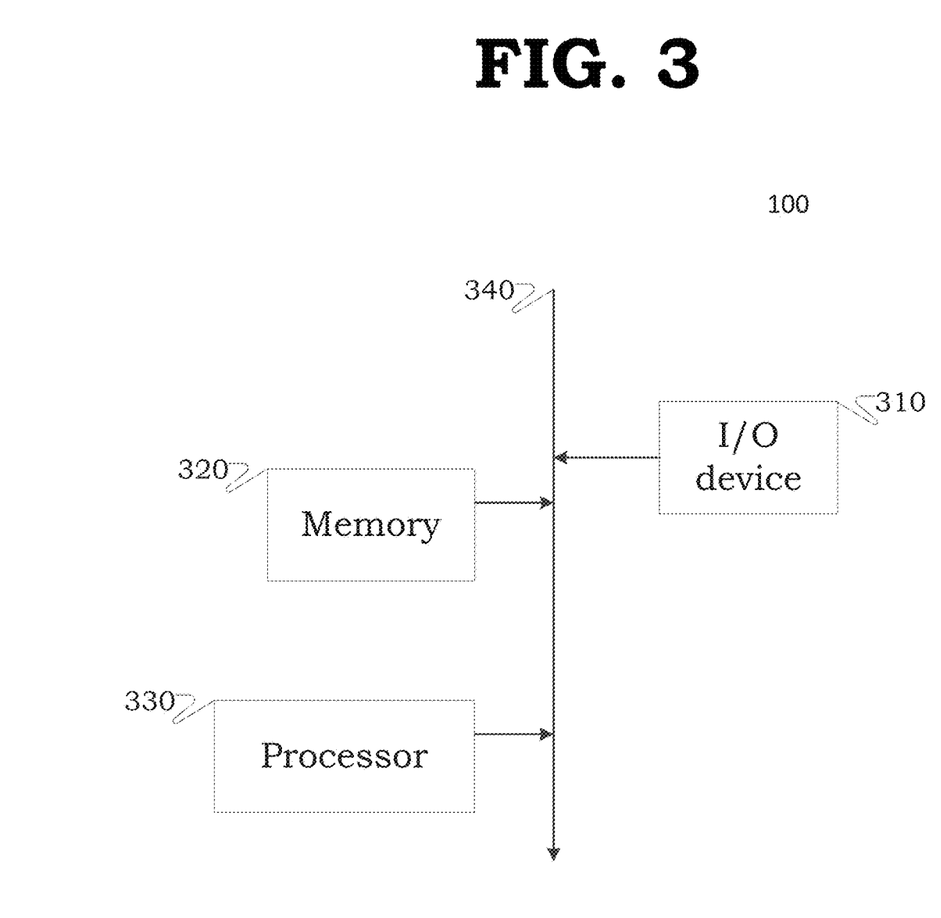
FIG. 3 is a block diagram illustrating a data processing apparatus according to example embodiments.

FIG. 3 is a block diagram illustrating a data processing apparatus according to example embodiments.

Referring to FIG. 3, the data processing apparatus 100 may include (I/O) device 310, a memory 320, processing circuitry 330 and a bus 340.

The I/O device 310 included in the data processing apparatus 100 may include various interfaces including one or more transmitters/receivers (or transceivers) connected one or more antennas or wires to wirelessly or wiredly transmit/receive control and data signals.

The transmitters may be devices that include hardware and software for transmitting signals including, for example, control signals or data signals via one or more wired and/or wireless connections to other network elements over the network 130. Likewise, the receivers may be devices that include hardware and software for receiving wireless signals including, for example, control signals or data signals via one or more wired and/or wireless connections to other network elements over the network 130.

The memory 320 may be a computer readable storage medium that generally includes a random access memory (RAM), read only memory (ROM), and/or a permanent mass storage device, such as a disk drive. The memory 320 also stores an operating system and any other routines/modules/applications for providing the functionalities of the data processing apparatus 100. These software components may also be loaded from a separate computer readable storage medium into the memory 320 using a drive mechanism (not shown). Such separate computer readable storage medium may include a disc, tape, DVD/CD-ROM drive, memory card, or other like computer readable storage medium (not shown). In some example embodiments, software components may be loaded into the memory 220 via one or more interfaces (not shown), rather than via a computer readable storage medium.

The processing circuitry 330 may be, but not limited to, a processor, Central. Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

The processing circuitry 330 may be configured, through a layout design and/or execution of computer readable instructions stored in the memory 320, as a special purpose computer to recover a network connection with the one or more source devices 110.

As discussed in more detail below, with reference to FIGS. 4 to 6, the processing circuitry 330 may include one or more processors configured to execute instructions to program the processors into special purpose processors that are configured to separate acquisition of data and processing into different threads of the same process, and, terminate the acquisition thread when the processing thread is unable to retrieve a frame from the acquisition thread. The processing circuitry 330 may improve the functioning of the data processing apparatus 100 itself, by securely maintaining all important application state within the processing thread when the data processing apparatus 100 terminates the acquisition thread.

As will be appreciated, depending on implementation, the data processing apparatus 100 may include additional components other than those shown in FIG. 3. However, it is not necessary that all of these generally conventional components be shown in order to convey illustrative example embodiments to persons having ordinary skill in the art.

Further, in some example embodiments, the data processing apparatus 100 may be implemented via cloud computing such that one or more the memory 320 and processing circuitry 330 are performed by functional equivalent cloud-based abstractions.

Figure 4:
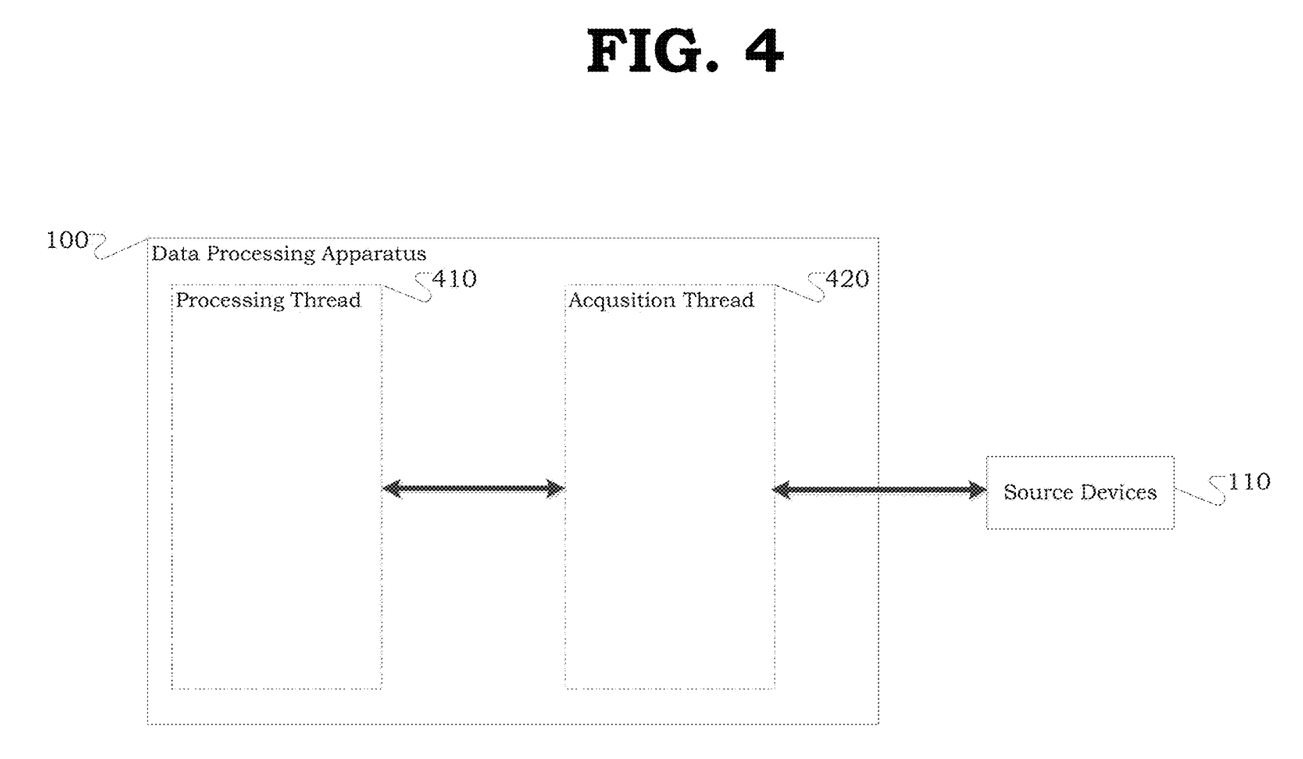
FIG. 4 illustrates an example of a usage model executed by a data processing apparatus according to one or more example embodiments.

FIG. 4 illustrates an example of usage model executed by a data processing apparatus according to one or more example embodiments.

Referring to FIG. 4, in one or more example embodiments, the data processing apparatus 100 may separate acquisition of data and processing into different threads of the same process.

The threads may be components of a process that can be managed independently by the data processing apparatus 100. The threads, unlike processes, may effectively share resources, such as memory, by, for example, sharing executable code and the values of variables at any given time. When the processing apparatus 100 is a single-core system, the data processing apparatus 100 may perform multithreading using time slicing to switch between different ones of the threads. Such time slicing may be more effectively performed by threads in comparison to separate processes. In contrast, when the data processing apparatus 100 is a multi-core system, the data processing apparatus 100 may execute the threads in parallel, with different processors or cores executing separate threads simultaneously.

For example, the data processing apparatus 100 may separate a process 400 into a processing thread 410 an acquisition thread 420.

The data processing apparatus 100 may utilize the acquisition thread 420 to acquire and temporarily store one or more frames of the media stream, and utilize the processing thread 410 to retrieve the frames from the acquisition thread 420 and perform processing on the same. Further, the data processing apparatus 100 may utilize the processing thread 410 to kill the acquisition thread 420, if the acquisition thread 420 is non-responsive. The data processing apparatus 100 may maintain application state information, such as information associated with the frames such as averages, peaks, trends, minimums, correlations, etc., within the processing thread 410 when the data processing apparatus 100 terminates the acquisition thread 420, since the application state information may safely remain within the processing thread 410.

Figure 5:
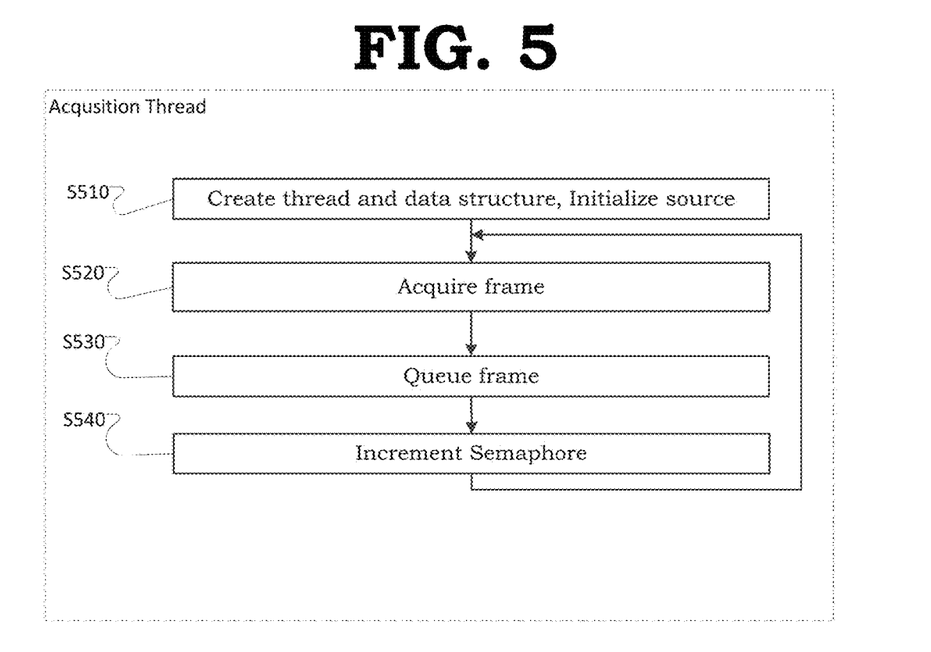
FIG. 5 illustrates a flow chart of a method executed by a data processing apparatus within an acquisition thread according to one or more example embodiments.

FIG. 5 illustrates a flow chart of a method executed by a data processing apparatus within an acquisition thread according to one or more example embodiments.

Referring to FIG. 5, as discussed in more detail below with reference to FIG. 6, the processing thread 410 may create the acquisition thread 420 and utilize the acquisition thread 420 to acquire a frame from a media stream. However, while the processing thread 410 may create the acquisition thread 420, for the sake of clarity, the operations of the acquisition 420 including the potential hang state thereof will be discussed first with reference to FIG. 5.

In operation S510, the data processing apparatus 100 may create the acquisition thread 420 and a data structure, such as a data queue in the memory 320 to temporarily store frames of the media stream. Further, the data processing apparatus 100 may utilize the acquisition thread 420 to initialize a connection with one of the source devices 110.

For example, in some example embodiments, the data processing apparatus 100 may perform, via the acquisition thread 420, an OpenCV video source initialization using an OpenCV API function such as cvCaptureFromFile. The data processing apparatus 100 may use this function by supplying a single argument identifying the source device 110. The source device 110 may be a file containing data encoded by a standard video encoder, or a Uniform Resource Locator (URL) that uniquely identifies the source device 110.

If the function is able to identify the source device 110, for example, when an address identifying the source device 110 is valid, the function may return a pointer to an opaque data structure, i.e. a data structure that is difficult to examine, and from which information cannot easily be extracted, by the application code.

In operation S520, the data processing apparatus 100 may utilize the acquisition thread 420 to attempt to acquire a frame of the media stream from the source device 110.

For example, in some example embodiments, the data processing apparatus 100 may execute, via the acquisition thread 420, an OpenCV API function such as cvQueryFrame. The acquisition thread 420 may use this function by, for example, providing, as an argument, the opaque data structure returned by cvCaptureFromFile operation executed in operation S510. However, example embodiments are not limited thereto.

The data processing apparatus 100 may receive a data structure that contains a frame of the data, when the OpenCV API function acquires the next frame. For example, when the media stream is a video stream, the data processing apparatus 100 may receive a data structure that contains an image of the video stream as a bitmap image, when the OpenCV API function acquires the next video frame.

In contrast, if the OpenCV API function fails to acquire the next frame, the OpenCV API function may return a null value to the acquisition thread 420. However, if the source device 110 is a networked camera, such as an IP camera, the function may not return but instead may enter a hanging state.

As discussed in more detail below with reference to FIG. 6, the processing thread 410 may detect the hanging state of the acquisition thread 420 by, for example, detecting expiration of a timer prior to availability of a new frame, and my attempt to remedy the hanging state by, for example, restarting the acquisition thread 420.

In operation S530, the data processing apparatus 100 may utilize the acquisition thread 420 to queue the acquired frame of the media stream, and to provide the queued frame to the processing thread 410 upon request.

In operation S540, the acquisition thread 420 may provide an indication to the processing thread 410 that a frame is available from the data queue.

For example, due to the creation of the threads, rather than separate processes, the data queue may be efficiently accessible by both the processing thread 410 and the acquisition thread 420. Since both the processing thread 410 and the acquisition thread 420 may efficiently access the memory 320, in some example embodiments, the data processing apparatus 100 may utilize a semaphore, which is a computer operating system control that is designed to help manage access to a shared resource, to facilitate cooperation between the threads. The semaphore may be a counting semaphore, whose value may be incremented or decremented. In other example embodiments, the data processing apparatus 100 may utilize other methods to manage the shared resource. For example, the data processing apparatus 100 may use a "mutex" and a "sleep" function to simulate the same functionality as a counting semaphore.

For example, the acquisition thread 420 may increment the semaphore when the acquisition thread 420 places a frame in the data queue, thus indicating to the processing thread 410 that at least one frame is available. As discussed, below, with reference to FIG. 6, before the processing thread 410 removes a frame from the data queue, the processing thread 410 may attempt to decrement the semaphore. If the semaphore count is a set value (for example, a zero value), the processing thread 410 may wait in place until the acquisition thread 420 stores a new frame in the data queue and increments the semaphore value. Thus, in addition to maintaining a count of frames in the data queue, the data processing apparatus 100 may utilize the semaphore to regulate the flow of the processing thread 410 by instructing the processing thread 410 to only extract a frame, when at least one frame is available. Therefore, when a frame is not available, the data processing apparatus 100 may reduce the processing burden placed on the system.

Figure 6:
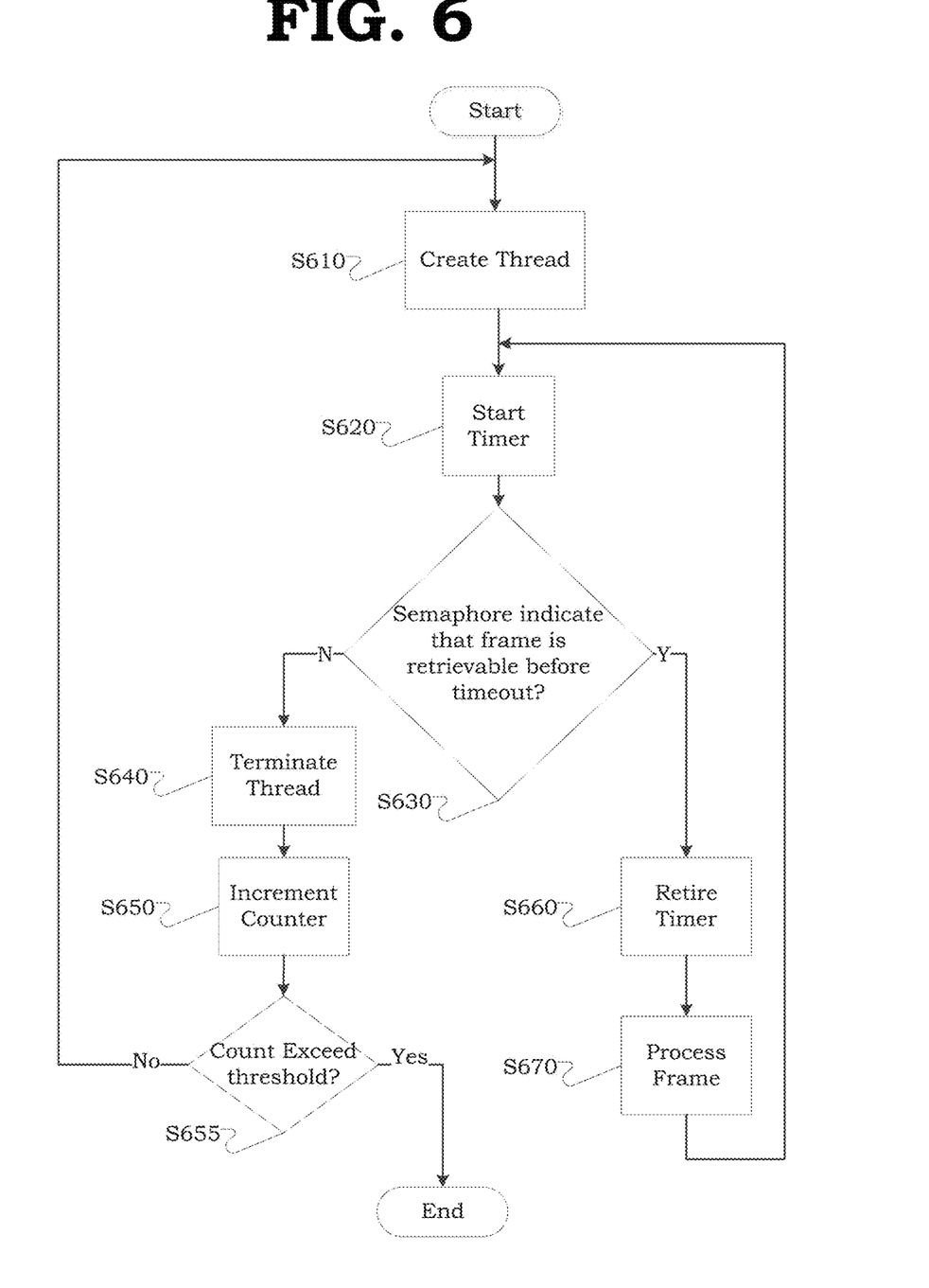
FIG. 6 illustrates a flow chart of a method executed by a data processing apparatus within a processing thread according to one or more example embodiments.

FIG. 6 illustrates an example of a processing thread executed by a data processing apparatus according to one or more example embodiments.

Referring to FIG. 6, in operation S610, the data processing apparatus 100 may create the processing thread 410, and instruct the processing thread 410 to create the acquisition thread 420. For example, the data processing apparatus 100 may create the processing thread 410 in response to execution of code stored in the memory 320 on the processor 330.

For example, the data processing apparatus 100 may create the processing thread 410 such that the processing thread 410 is the main thread of the process, and the processing thread 410 may create one or more subordinate, acquisition threads 420 to acquire frames from the media stream.

For example, the processing thread 410 may create a separate acquisition thread 420 for each of the one or more source devices 110. However, example embodiments are not limited thereto.

Since the processing thread 410 creates the acquisition thread 420, the processing thread 410 may be able to destroy and recreate the acquisition thread 420, if necessary. Further, since each of the one or more source devices 110 may be associated with a separate acquisition thread 420, the rest of the one or more source devices 110 may be unaffected by the destruction of the acquisition thread 420 associated with a particular one of the one or more source devices 110.

In operation S620, the processing thread 410 may set a tinier to have an expiration time that is several times the frame period. Expiration of this timer may imply that a network interruption is blocking receipt of a new frame.

In operation S630, the processing thread 410 of the data processing apparatus 100 may attempt to retrieve a frame from the data queue before the timer expires, where the frame was placed in the data queue by the acquisition thread 420. Namely, the data processing apparatus 100 may analyze the semaphore to determine whether the semaphore indicates that a frame is unavailable before timeout of the timer.

For example, the processing thread 410 may determine whether a new frame is available by analyzing the semaphore to determine whether the semaphore has a set value (e.g., a zero value) that cannot be decremented. For example, the processing thread 410 may attempt to decrement the semaphore, and if the value of the semaphore is the set value, the processing thread 410 may be forced to wait until the acquisition thread 420 increments the semaphore. This wait time may exceed the expiration time of the timer.

In operation S640, if the timer has timed out prior to the semaphore value being incremented, for example, by the semaphore remaining equal to the set (e.g., the zero value) at the expiration of the timer, the processing thread 410 may terminate and recreate the acquisition thread 420.

Upon terminating the acquisition thread 420, the application state information may remain within the processing thread 410, and, therefore, data, such as, averages, peaks, trends, minimums, correlations, etc., over time, may not be lost due to the termination of the acquisition thread 420.

In some example embodiments, in operation S650, the processing thread 410 may also increment a counter indicating a number of times the acquisition thread 420 has been recreated before proceeding back to operation S610. For example, depending on the nature and duration of the network interruption, the recreation of the acquisition thread 420 may result in resumption of the frame flow. However, some network problems may not be resolved by recreating the acquisition thread 420, therefore, the data processing apparatus 100 may set a limit on the number of retries and/or issue a system error message about a networking problem if the counter indicates that the acquisition thread 420 has been terminated and recreated a threshold number of times.

Therefore, in some example embodiments, in operation S655, the processing thread 410 may determine whether the counter indicates that number of recreations of the acquisition thread 420 exceeds threshold. If the number of recreations of the acquisition thread 420 is less than or equal to the threshold, the processing thread 410 may proceed back to operation S610 and recreate the acquisition thread 410. In contrast, if the number of recreations of the acquisition thread 420 is greater than the threshold, the processing thread 410 may terminate the process. In some example embodiments, the processing thread 410 may provide an error message to the user via a display (not shown) and/or save the error message to a log prior to terminating the process.

In operation S660, if the processing thread 410 determines in operation S630 that the data queue contains a new frame therein prior to expiration of the timer, the processing thread 410 may retire the timer and may decrement the semaphore.

In operation S670, the processing thread 410 may acquire the frame from the data queue, perform application processing on the acquired frame, and then proceed back to operation S620 to reset the timer and retrieve the next frame from the queue associated with the source device 110.

For example, the processing thread 410 may process the acquired frame to perform recognition and tracking on objects therein. Further, in some example embodiments, the processing thread 410 may perform motion flow characterization on the acquired frame according to the density, direction, and velocity of motion therein. The data processing apparatus 100 may use the results of such processing as inputs to surveillance and monitoring systems to provide automatic and rapid detection of events that require human attention.

The data processing apparatus 100 may maintain the application state information within the processing thread 410 when the data processing apparatus 100 terminates the acquisition thread 420. Therefore, the system may be resilient to failures that interrupt processing since all important application state may safely remain within the processing thread 410.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

We claim:

1. A data processing apparatus comprising:
   at least one processor configured to execute a process including at least a processing thread, the processing thread configured to,
      create an acquisition thread within the process, the acquisition thread being subordinate to the processing thread,
      request a frame associated with a source device from the acquisition thread, and
      restart the acquisition thread, if the frame is unavailable.

2. The data processing apparatus of claim 1, wherein the processor is configured to restart the acquisition thread such that state information associated with the process remains intact within the processing thread when the acquisition thread is terminated.

3. The data processing apparatus of claim 1, wherein the processor is configured to recover a network connection between the acquisition thread and the source device by iteratively restarting the acquisition thread until the frame is available.

4. The data processing apparatus of claim 1, wherein the processor is configured to extract the frame from a data queue.

5. The data processing apparatus of claim 4, wherein the data queue is simultaneously accessible by the acquisition thread and the processing thread.

6. The data processing apparatus of claim 4, wherein the processor is configured to restart the acquisition thread, if the processor determines that the frame is unavailable in the data queue within a set time period after requesting the frame.

7. The data processing apparatus of claim 6, wherein the processor is configured to determine, within the processing thread, whether the frame is unavailable by analyzing a semaphore accessible by both the acquisition thread and the processing thread, the semaphore indicating whether the frame is available for extraction by the processing thread.

8. The data processing apparatus of claim 7, wherein the processor is configured to instruct the acquisition thread to,
   attempt to establish a network connection with the source device, and
   if the network connection is established, acquire the frame from the source device over the network connection, store the frame in the data queue, and increment the semaphore.

9. The data processing apparatus of claim 8, wherein the processor is configured to instruct the acquisition thread to establish the network connection by calling an Open Source Computer Vision (OpenCV) function, the OpenCV function abstracting one or more pieces of information associated with the network connection from the acquisition thread.

10. A method of recovering a network connection to one or more source devices, the method comprising:
    creating an acquisition thread within the process, the acquisition thread being subordinate to a processing thread;
    requesting a frame associated with a source device from the acquisition thread; and
    restarting the acquisition thread, if the frame is unavailable.

11. The method of claim 10, wherein the restarting restarts the acquisition thread such that state information associated with the process remains intact within the processing thread when the acquisition thread is terminated.

12. The method of claim 10, wherein
    the requesting includes extracting the frame from a data queue, and
    the restarting includes iteratively restarting the acquisition thread until the frame is available to recover a network connection between the acquisition thread and the source device.

13. The method of claim 10, further comprising:
    determining whether the frame is unavailable by analyzing a semaphore accessible by both the acquisition thread and the processing thread, the semaphore indicating whether the frame is for extraction by the processing thread, wherein
    the restarting restarts the acquisition thread, if the determining determines that the frame is unavailable in a data queue within a set time period after requesting the frame.

14. The method of claim 13, further comprising:
    attempting to establish a network connection with the source device, and
    if the network connection is established, acquiring the frame from the source device over the network connection, storing the frame in the data queue, and incrementing the semaphore.

15. The method of claim 14, wherein the attempting to establish comprises:
    attempting to establish, via the acquisition thread, the network connection with the source device by calling an Open Source Computer Vision (OpenCV) function, the OpenCV function abstracting one or more pieces of information associated with the network connection from the acquisition thread.

16. A data streaming system comprising:
    a source device configured to stream data; and
    a data processing apparatus including a processor configured to execute a process including at least a processing thread, the processing thread configured to,
       create an acquisition thread within the process, the acquisition thread being subordinate to the processing thread,
       request a frame associated with the source device from the acquisition thread, and
       restart the acquisition thread, if the frame is unavailable.

17. The data streaming system of claim 16, wherein the data processing apparatus is configured to, within the processing thread,
    extract the frame from a data queue, and
    iteratively restart the acquisition thread until the frame is available to recover a network connection between the acquisition thread and the source device such that state information associated with the process remains intact within the processing thread when the acquisition thread is terminated.

18. The data streaming system of claim 16, wherein the data processing apparatus is configured to, determine, within the processing thread, whether the frame is unavailable by analyzing a semaphore accessible by both the acquisition thread and the processing thread, the semaphore indicating whether the frame is available for extraction by the processing thread, and restart the acquisition thread, if the data processing apparatus determines, within the processing thread, that the frame is unavailable in a data queue within a set time period after requesting the frame.

19. The data streaming system of claim 18, wherein the data processing apparatus is configured to, attempt to establish, via the acquisition thread, a network connection with the source device by calling an Open Source Computer Vision (OpenCV) function, the OpenCV function abstracting one or more pieces of information associated with the network connection from the acquisition thread, and if the network connection is established, acquire the frame from the source device over the network connection, store the frame in the data queue, and increment the semaphore.

20. A non-transitory computer readable medium storing instructions, that, when executed by a processor, configure the processor to perform the method of claim 10.

* * * * *